US008060586B2

(12) United States Patent
Yang et al.

(10) Patent No.: US 8,060,586 B2
(45) Date of Patent: Nov. 15, 2011

(54) DYNAMIC WEB SERVICE DEPLOYMENT AND INTEGRATION

(75) Inventors: Li Yang, Redmond, WA (US); Balamurugan Kuthanoor, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 346 days.

(21) Appl. No.: 12/364,970

(22) Filed: Feb. 3, 2009

(65) Prior Publication Data

US 2010/0198948 A1 Aug. 5, 2010

(51) Int. Cl.
G06F 15/177 (2006.01)
(52) U.S. Cl. ......... 709/222; 709/217; 709/218; 709/219
(58) Field of Classification Search .......... 709/217–219, 709/222
See application file for complete search history.

(56) References Cited

U.S. PATENT DOCUMENTS

| 7,188,155 | B2 | 3/2007 | Flurry | |
|---|---|---|---|---|
| 2004/0176988 | A1 | 9/2004 | Boughannam | |
| 2006/0206599 | A1* | 9/2006 | Milligan et al. | 709/223 |
| 2007/0094364 | A1 | 4/2007 | Oberhauser | |
| 2007/0233820 | A1* | 10/2007 | Schneider | 709/220 |
| 2009/0106350 | A1* | 4/2009 | Chen et al. | 709/203 |
| 2009/0274299 | A1* | 11/2009 | Caskey et al. | 380/255 |
| 2010/0100525 | A1* | 4/2010 | Huang | 707/609 |

OTHER PUBLICATIONS

Forsberg, Christian; "Managing Remote Devices with Odyssey Athena and XML Web Service"; http://msdn.microsoft.com/en-us/library/ms839347.aspx; Aug. 2005 (Copy Attached).

Verheecke; Bart, Cibran; Maria Agustina; "AOP for Dynamic Configuration and Management of Web Services"; http://ssel.vub.ac.be/wsml/papers/Verheecke_Cibran_ICWS03.pdf; 2003 (Copy Attached).

Amirian; Pouria, Alesheikh; Ali A.; "A Hybrid Architecture for Implementing Efficient Geospatial Web Services: Integrating .NET Remoting and Web Services Technologies"; http://serv2.ist.psu.edu:8080/viewdoc/summary; jsessionid=10EC96C9E1E428C1E1942CDD2E791F4C?doi=10.1.1.111.4103; 2008 (Copy Attached).

* cited by examiner

Primary Examiner — Mohamed Wasel
(74) Attorney, Agent, or Firm — Workman Nydegger

(57) ABSTRACT

A computer system receives registration information from a service provider registering web services with the dynamic web service configuration store. The registration information indicates a mapping of which web service components are to be used with corresponding user requests. The computer system receives a request from a user requesting a portion of web service functionality and provides the web service functionality using the web service component indicated in the mapping. The computer system receives an indication from the service provider that various web service components are to be updated, where the indication includes updated web service component portions. The computer system also dynamically updates the web service component, so that subsequent user requests for the same portion of web service functionality are processed using the updated web service component.

20 Claims, 4 Drawing Sheets

DYNAMIC WEB SERVICE DEPLOYMENT AND INTEGRATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client computer system might connect to a server in a datacenter to access a service. The service could provide simple or complex functionality, and may be able to communicate with other services in the process while providing the desired functionality. Such services are often referred to as software as a service (SAAS).

Datacenters configured to provide such services often provide a variety of generalized system services, as well as more specific business-specific services. Providing both the generalized services the business-specific services often leads to inefficiencies system-wide.

BRIEF SUMMARY

Embodiments described herein are directed to providing dynamically updatable web service components. In one embodiment, a computer system receives, at a dynamic web service configuration store, registration information from a service provider registering web services with the dynamic web service configuration store, the registration information indicating a mapping of which web service components are to be used with corresponding user requests. The computer system receives a request from a user requesting a portion of web service functionality and provides the web service functionality using the web service component indicated in the mapping. The computer system receives an indication from the service provider that various web service components are to be updated, the indication including updated web service component portions. The computer system also dynamically updates the web service component, so that subsequent user requests for the same portion of web service functionality are processed using the updated web service component.

In an alternative embodiment, a computer system receives at a dynamic web service configuration store a request from a user for a portion of web service functionality, where the dynamic web service configuration store is configurable to allow dynamic changes to both web service component mappings indicating which web service components are to be used with a corresponding user request, and data structure mappings indicating which data structures are to be used with a corresponding user request. The computer system determines an appropriate web service component and data structure mapping based on the received user request. The computer system provides the web service functionality using the web service component and data structure indicated in the mapping and determines that a web service component has been dynamically updated based on information provided to the dynamic web service configuration store by the web service provider. The computer system also dynamically implements the updated component to process subsequent user requests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 4 illustrates a computer architecture which includes elements embodiment of the present invention in which.

DETAILED DESCRIPTION

Figure 1:
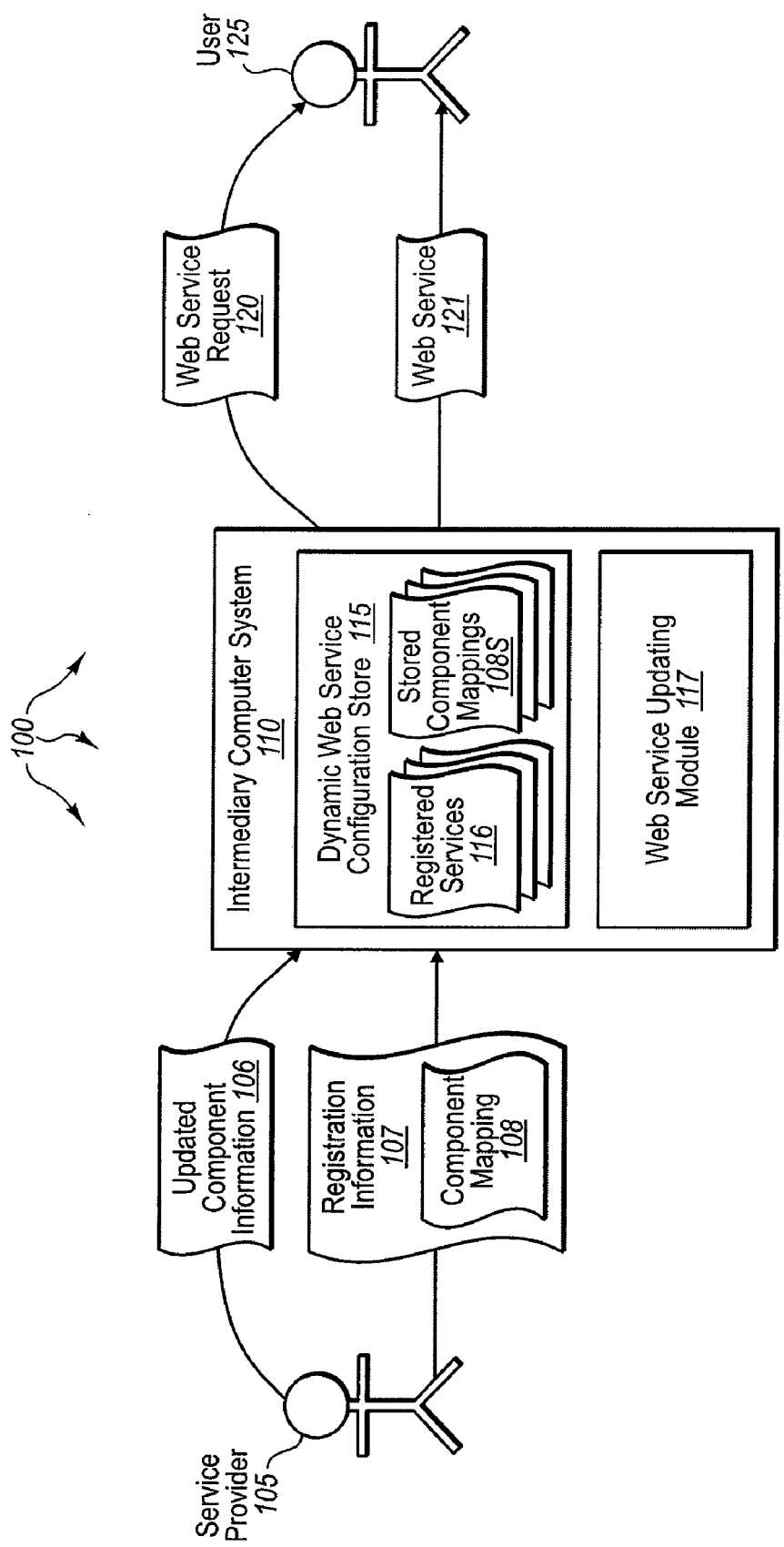
FIG. 1 illustrates a computer architecture in which embodiments of the present invention may operate including providing dynamically updatable web service components.

Embodiments described herein are directed to providing dynamically updatable web service components. In one embodiment, a computer system receives, at a dynamic web service configuration store, registration information from a service provider registering web services with the dynamic web service configuration store, the registration information indicating a mapping of which web service components are to be used with corresponding user requests. The computer system receives a request from a user requesting a portion of web service functionality and provides the web service functionality using the web service component indicated in the mapping. The computer system receives an indication from the service provider that various web service components are to be updated, the indication including updated web service component portions. The computer system also dynamically updates the web service component, so that subsequent user requests for the same portion of web service functionality are processed using the updated web service component.

In an alternative embodiment, a computer system receives at a dynamic web service configuration store a request from a user for a portion of web service functionality, where the dynamic web service configuration store is configurable to allow dynamic changes to both web service component mappings indicating which web service components are to be used with a corresponding user request, and data structure mappings indicating which data structures are to be used with a corresponding user request. The computer system determines an appropriate web service component and data structure mapping based on the received user request. The computer system provides the web service functionality using the web service component and data structure indicated in the mapping and determines that a web service component has been dynamically updated based on information provided to the dynamic web service configuration store by the web service provider. The computer system also dynamically implements the updated component to process subsequent user requests.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes intermediary computer system 110 ("intermediary 110" or "system 110" herein). Intermediary 110 may be any type of computing system including a server computing system, client computing system (including portable computing systems such as laptops) or any other type of computing system. Intermediary 110 includes dynamic web service configuration store 115 ("configuration store 115" herein) which is configured to interact with other elements and modules of architecture 100.

For example, configuration store 115 may receive registration information 107 from service provider 105. Service provider 105 may be any type of computer user or entity including developers, companies, end-users or other persons capable of providing a service. Typically, such services are web services accessible through a browser. However, the services provided by service provider 105 may be any type of services including stand-alone applications, server applets or other portions of software code or portions of software applications. Registration information 107 may include information about the various services provided by service provider 105. In addition to identifying those services that are provided, registration information 107 may also identify how to interact with or initiate those services. For instance, various web service components may be initialized using component mappings 108. As web service components are changed by the developer (or other users), the updates 106 may be sent to intermediary computer system 110, which may be then incorporated into the existing (registered) web services 116 by web service updating module 117.

Thus, service provider 105 may be able to register a web service which is stored in configuration store 115 as a registered service 116. Component mappings 108 may be used to identify various components within the registered web service, each of which may be individually updatable. The updates, sent as updated component information 106, may be applied dynamically while the web service is running and may be applied automatically on a set schedule or at a user-appointed time. As web service updating module 117 applies the component updates, end-user 125 may, in response to web service request 121, receive web service 121 with updated components. Thus, in some embodiments, a user may request a web service and begin using that service while, in the background, the service provider is updating one or more components of that web service. Upon detecting that at least some of the web service's components have been updated, intermediary computer system 110 can immediately begin providing the web service 121 with the updated components. In some cases, the transition to a new web service component may occur transparently to the user. In other cases, where the changes to the web service component(s) are more drastic, user 125 may be aware that parts of the web service have changed. This process will be described in greater detail below with regard to method 200 of FIG. 2.

Figure 2:
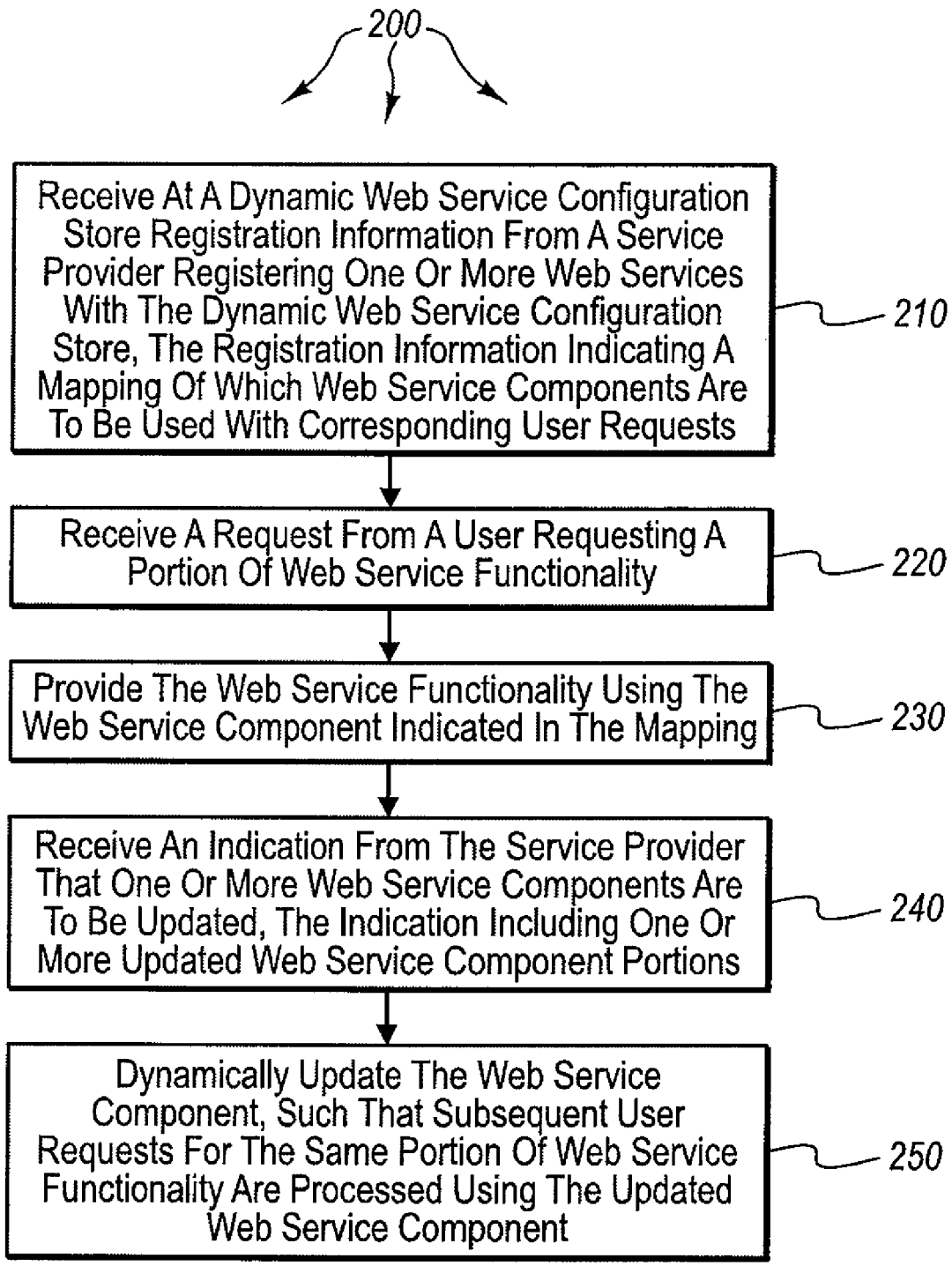
FIG. 2 illustrates a flowchart of an example method for providing dynamically updatable web service components.
Figure 4:
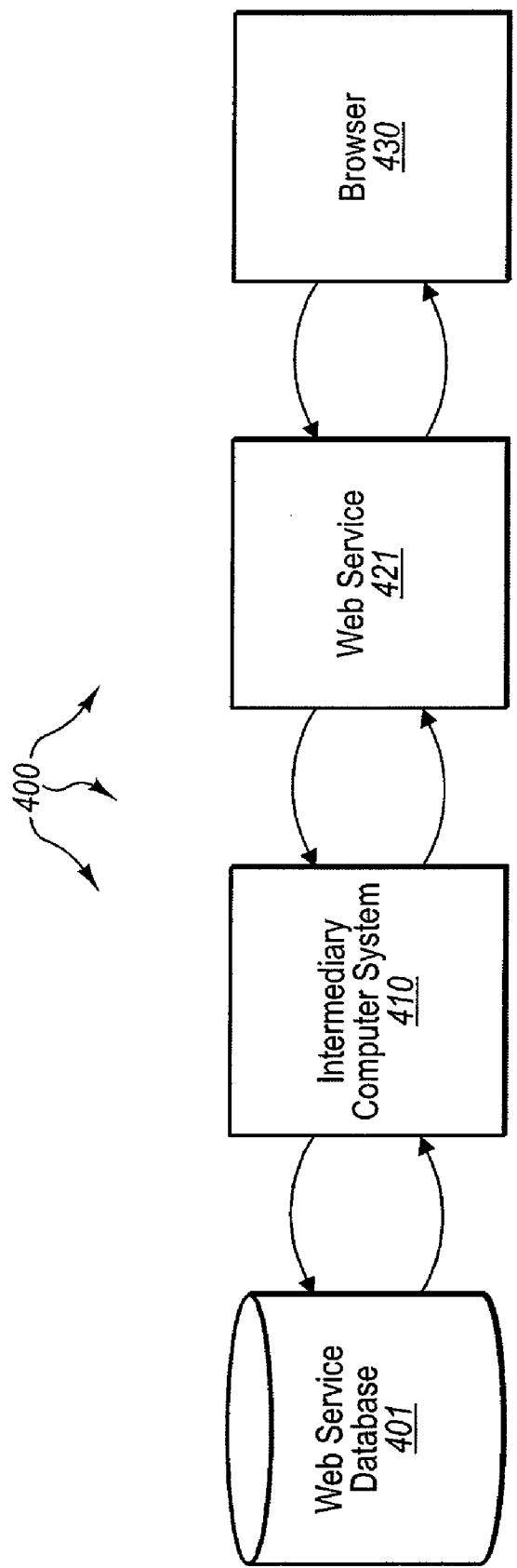

FIG. 2 illustrates a flowchart of a method 200 for providing dynamically updatable web service components. The method 200 will now be described with frequent reference to the components and data of environments 100 of FIG. 1 and 400 of FIG. 4.

Method 200 includes an act of receiving at a dynamic web service configuration store registration information from a service provider registering one or more web services with the dynamic web service configuration store, the registration information indicating a mapping of which web service components are to be used with corresponding user requests (act 210). For example, dynamic web service configuration store 115 may be configured to receive registration information 107 from service provider 105 registering various web services with the configuration store. Registration information 107 may indicate a mapping (108) of which web service components are to be used in conjunction with a received web service request 120 received from user 125. Thus, in one embodiment, a user may send a web service request through the user's interaction with a web browser. The request 120 is received by intermediary system 110, upon which the system determines which service(s) or service components are to be used to handle the user's service request. In some cases, component mappings 108 may be stored in configuration store 115 as stored component mappings 108S in a look-up table or other data structure. As a result, a web service request may simply query configuration store 115 to determine which service components are to be used to satisfy a client's web service request.

In some cases, configuration store 115 may be configurable to allow dynamic changes to both web service component mappings 108 indicating which components are to be used with a corresponding user request, as well as data structure mappings (which may be part of component mappings 108) indicating which data structures are to be used with a corresponding user request. Accordingly, when service provider 105 desires to make a change to a web service or web service component, the service provider is able to dynamically change (via updates 106) which web service components are to be used to handle certain user web service requests. Moreover, the service provider is also to dynamically change which data structures are to be used to process the user's service request. For example, in a business-oriented web service such as an order processing service, the service provider may be able to choose between different formats for storing the user's contact information, order information, and shipment information. This is just one example of how a service provider can change the component mapping information, and should not be read as being limited to the above example.

Dynamic web service configuration store 115 may be configured to receive and store updates received from a variety of different service providers. Intermediary computer system 110 may be configured to process a substantially limitless number of web service registrations and may also receive updates regarding different web services, components and/or mappings. Thus, a service provider may have up-to-the minute control over which web services or web service components are being used to handle a client's web service request.

Method 200 includes an act of receiving a request from a user requesting a portion of web service functionality (act 220). For example, intermediary system 110 may receive web service request 120 from user 125 requesting a portion of web service functionality. In some cases, the requested portion of web service functionality provided by the web service component may comprise a business action such as the signing-up of a new customer. The service provider may be able to specify which web service (component) is used to process the signing-up. As explained above, the service provider may, after an initial web service has been chosen, update the entire service or a component thereof, and while updating the component, update the component's corresponding mapping to ensure that the new component is used to process the user's request. When updating the mapping, the service provider may update the manner in which the web service (business action) maps to one or more web service data structures. The data structures may also be updated separately from, or in addition to, the web service component mappings.

Method 200 includes an act of providing the web service functionality using the web service component indicated in the mapping (act 230). For example, intermediary computer system 110 may provide the web service functionality (121) to user 125 using the web service component indicated in the mapping. Thus, if user 125 requests functionality A in web service request 120, intermediary server 110 (or configuration store 115) will check the mappings stored with registered services 116 to determine which web service or web service component is to be used to provide functionality A. This service is selected, and the user's request is processed using the selected web service.

Method 200 includes an act of receiving an indication from the service provider that one or more web service components are to be updated, the indication including one or more updated web service component portions (act 240). For example, intermediary computing system 110 may receive updated component information 106 indicating that one or more web service components are to be updated. The updated component information may also include updated web service component portions or entire web service components.

Method 200 includes an act of dynamically updating the web service component, such that subsequent user requests for the same portion of web service functionality are processed using the updated web service component (act 250). For example, web service updating module 117 of intermediary computer system 110 may dynamically update any of the web service components stored in configuration store 115. In this manner, any web service requests received requesting the functionality provided by the updated web service. In some cases, the mapping indicating which user requests are to be handled by a given web service (or group of services) is automatically updated based on a determination that the web service component has been updated. Thus, intermediary computer system may detect when a component has been updated and, as a result, automatically update the mapping to map to the current, updated version of the component.

Updating the web service components may include adding extended functionality to an existing web service component, so that the updated existing web service component is configured to provide both its existing functionality and the newly extended functionality. In some cases, intermediary computer system 110 may determine that changes have been made to one or more data files in a database communicatively connected to the dynamic web service configuration store 115. In response, system 110 may automatically and dynamically update those web service components configured to use the updated data files. Accordingly, as illustrated in environment 400 of FIG. 4, intermediary computer system 410 may be configured to communicate with web service database to access both the web services and information that is used by the web service. This process may be performed as a result of a web service request received from a user at a browser 430

(or from web service 421 which may be running as part of browser 430). The intermediary computer system 410 may thus provide web service 421 to the user via the browser, the web service including (or having access to) the information stored in web service database 401.

Figure 3:
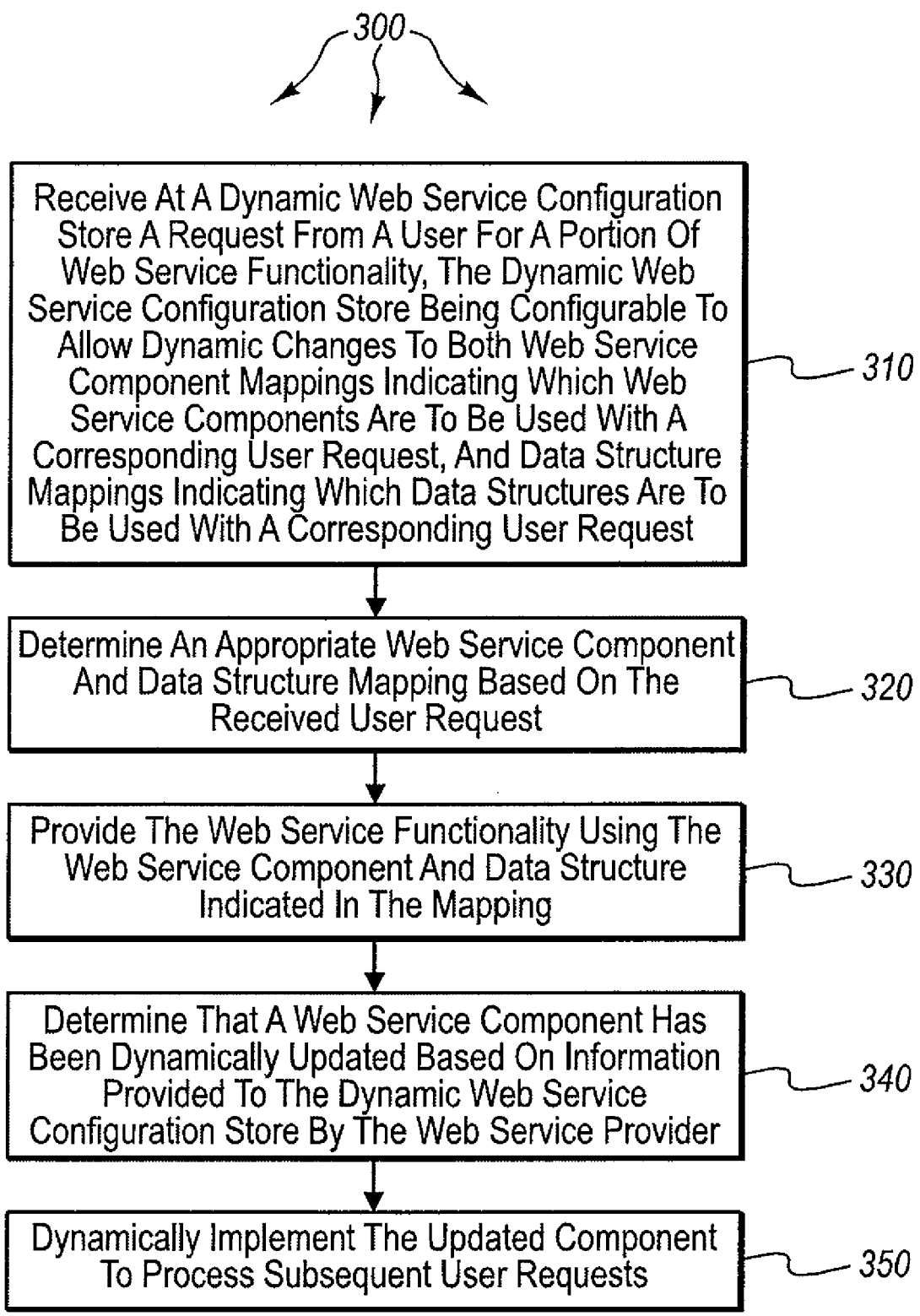
FIG. 3 illustrates a flowchart of an alternative example method for providing dynamically updatable web service components.

FIG. 3 illustrates a flowchart of a method 300 for providing dynamically updatable web service components. The method 300 will now be described with frequent reference to the components and data of environments 100 of FIG. 1 and 400 of FIG. 4.

Method 300 includes an act of receiving at a dynamic web service configuration store a request from a user for a portion of web service functionality, the dynamic web service configuration store being configurable to allow dynamic changes to both web service component mappings indicating which web service components are to be used with a corresponding user request, and data structure mappings indicating which data structures are to be used with a corresponding user request (act 310). For example, configuration store 115 may receive web service request 120 from user 125 requesting a portion of web service functionality. Configuration store 115 may be configurable to allow dynamic changes to both web service component mappings 108 indicating which web service components are to be used with a corresponding user request (e.g. 120), as well as data structure mappings indicating which data structures are to be used with a corresponding user request. In some cases, a request for web service functionality is received from a web application (such as from web service 421 which may be operating with browser 430). As explained above, dynamic web service configuration store 115 may be configured to receive and store requests received from multiple different end users 125.

Method 300 includes an act of determining an appropriate web service component and data structure mapping based on the received user request (act 320). For example, intermediary computer system 110 may determine, using mappings 108, which web service component and data structure mapping are appropriate to use to process each user's request, based on the functionality requested by each respective user.

Method 300 includes an act of providing the web service functionality using the web service component and data structure indicated in the mapping (act 330). For example, intermediary computer system 110 may provide web service functionality 121 to user 125 using the web service component(s) and/or data structure(s) indicated in mappings 108. In some cases, providing the web service functionality may include sending a web services description language (WSDL) data portion to the user indicating which web service component is to be used. User 125's browser may be configured to receive and interpret the WSDL data portion and use the information stored in the data to identify which web service component is to be used to handle the user's request.

Method 300 includes an act of determining that a web service component has been dynamically updated based on information provided to the dynamic web service configuration store by the web service provider (act 340). For example, intermediary computer system 110 may determine that at least one of the components of a web service have been dynamically updated based on information provided to configuration store 115 by service provider 105. Thus, intermediary system 110 may be informed any time a web service component is updated; thus, when a web service request is received, system 110 will know to use the updated web service to process the user's request. Additionally or alternatively, intermediary system 110 may determine that data used by a web service component itself in providing the web service functionality has been updated and, based on that determination, automatically update the corresponding web service's mappings. In such cases, changes made to data used by the web service component to provide the web service functionality may automatically cause the dynamic web service configuration store 115 to update one or more business actions made available by the web service component, based on the changes to the data.

Method 300 also includes an act of dynamically implementing the updated component to process subsequent user requests (act 350). For example, intermediary computing system may dynamically implement the updated component to process subsequent user requests for the updated web service. In some cases, intermediary system 110 may determine that changes have been made to one or more data files in a database communicatively connected to the dynamic web service configuration store and, based on that determination, automatically and dynamically update those web service components configured to use the updated data files. In this manner, a service provider can easily and dynamically update web service components without having to update the entire web service. Moreover, intermediary system 110 can automatically update the mappings when a new web service or web service component is uploaded. This helps to ensure that the user is always using the most up-to-date version of the web service component.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At an intermediary computer system in a computer networking environment including a plurality of computing systems, a computer-implemented method for providing dynamically updatable web service components, the method comprising:
    an act of receiving at a dynamic web service configuration store registration information from a service provider registering one or more web services with the dynamic web service configuration store, the registration information indicating a mapping of which web service components are to be used with corresponding user requests;
    an act of receiving a request from a user requesting a portion of web service functionality;
    an act of providing the web service functionality using the web service component indicated in the mapping;
    an act of receiving an indication from the service provider that one or more web service components are to be updated, the indication including one or more updated web service component portions;
    an act of dynamically updating the web service component, such that subsequent user requests for the same portion of web service functionality are processed using the updated web service component.

2. The method of claim 1, further comprising:
    an act of receiving a second user request for the same portion of web service functionality; and
    an act of implementing the updated web service component to provide the requested functionality to the user in response to the user's request.

3. The method of claim 2, wherein mapping is automatically updated based on a determination that the web service component has been updated.

4. The method of claim 1, wherein the portion of web service functionality provided by the web service component comprises a business action.

5. The method of claim 4, wherein the dynamic updating comprises updating the manner in which the business action maps to one or more web service data structures.

6. The method of claim 5, wherein the dynamic updating comprises updating one or more corresponding data structures associated with a web service component.

7. The method of claim 1, wherein the dynamic updating comprises adding extended functionality to an existing web service component, such that the updated existing web service component is configured to provide both its existing functionality and the extended functionality.

8. The method of claim 1, wherein the dynamic web service configuration store is configurable to allow dynamic changes to both web service component mappings indicating which components are to be used with a corresponding user request, as well as data structure mappings indicating which data structures are to be used with a corresponding user request.

9. The method of claim 1, wherein the dynamic web service configuration store is configured to receive and store updates received from one or more service providers.

10. The method of claim 1, further comprising:
an act of determining that changes have been made to one or more data files in a database communicatively connected to the dynamic web service configuration store; and
an act of automatically and dynamically updating those web service components configured to use the updated data files.

11. One or more recordable-type storage device having stored instructions for implementing a method for providing dynamically updatable web service components, the one or more storage device having stored thereon computer-executable instructions that, when executed by one or more processors of a computing system, cause the computing system to perform the method, the method comprising:
an act of receiving at a dynamic web service configuration store a request from a user for a portion of web service functionality, the dynamic web service configuration store being configurable to allow dynamic changes to both web service component mappings indicating which web service components are to be used with a corresponding user request, and data structure mappings indicating which data structures are to be used with a corresponding user request;
an act of determining an appropriate web service component and data structure mapping based on the received user request;
an act of providing the web service functionality using the web service component and data structure indicated in the mapping;
an act of determining that a web service component has been dynamically updated based on information provided to the dynamic web service configuration store by the web service provider;
an act of dynamically implementing the updated component to process subsequent user requests.

12. The one or more recordable-type storage device of claim 11, wherein the request for web service functionality is received from a web application.

13. The one or more recordable-type storage device of claim 11, wherein determining that the component has been dynamically updated comprises determining that data used by component to provide the web service functionality has been updated.

14. The one or more recordable-type storage device of claim 13, wherein changes made to data used by the web service component to provide the web service functionality automatically cause the dynamic web service configuration store to update one or more business actions made available by the web service component.

15. The one or more recordable-type storage device of claim 11, wherein providing the web service functionality comprises sending a web services description language (WSDL) data portion to the user indicating which web service component is to be used.

16. The one or more recordable-type storage device of claim 11, wherein the dynamic web service configuration store is configured to receive and store requests received from a plurality of end users.

17. The one or more recordable-type storage device of claim 11, further comprising:
an act of determining that changes have been made to one or more data files in a database communicatively connected to the dynamic web service configuration store; and
an act of automatically and dynamically updating those web service components configured to use the updated data files.

18. A computer system comprising the following:
one or more processors;
system memory;
one or more computer-readable storage media having stored thereon computer-executable instructions that, when executed by the one or more processors, causes the computing system to perform a method for providing dynamically updatable web service components, the method comprising the following:
an act of receiving at a dynamic web service configuration store registration information from a service provider registering one or more services with the dynamic web service configuration store, the registration information indicating a mapping of which web service components are to be used with corresponding user requests;
an act of receiving a request from a user requesting a portion of web service functionality;
an act of providing the web service functionality using the web service component indicated in the mapping;
an act of receiving an indication from the service provider that one or more web service components are to be updated, the indication including one or more updated web service component portions;
an act of dynamically updating the web service component, such that subsequent user requests for the same portion of web service functionality are processed using the updated web service component.

19. The computer system of claim 18, wherein the dynamic updating comprises adding extended functionality to an existing component, such that the updated existing component is configured to provide both its existing functionality and the extended functionality.

20. The computer system of claim 18, wherein the dynamic web service configuration store is configurable to allow dynamic changes to both component mappings indicating which components are to be used with a corresponding user request, as well as data structure mappings indicating which data structures are to be used with a corresponding user request.

* * * * *